United States Patent [19]

Habicht

[11] Patent Number: 4,797,050

[45] Date of Patent: Jan. 10, 1989

[54] APPARATUS FOR LIFTING AND TILTING DRUMS OF FLOWABLE MATERIAL

[76] Inventor: Helmut Habicht, 15 Royal Park Terrace, Hillsdale, N.J. 07642

[21] Appl. No.: 70,297

[22] Filed: Jul. 6, 1987

[51] Int. Cl.[4] .............................................. B65G 65/23

[52] U.S. Cl. ..................................... 414/420; 414/648

[58] Field of Search ............... 414/420, 422, 425, 648, 414/786; 187/9 R

[56] References Cited

U.S. PATENT DOCUMENTS 2,657,815 11/1953 Collins ................................ 414/420
3,499,564 3/1970 Hopfeld .......................... 414/648 X

FOREIGN PATENT DOCUMENTS 1235813 3/1967 Fed. Rep. of Germany ...... 414/420

*Primary Examiner*—Robert J. Spar
*Assistant Examiner*—Gary A. Cundiff
*Attorney, Agent, or Firm*—Anthony F. Cuoco

[57] ABSTRACT

This invention pertains to the lifting and tilting of a container of fluent materials. Two embodiments are shown, one having a vertical column disposed to carry the secured container to a predetermined height. This apparatus may be fixed or may be movable from and to selected positions. A slot is formed in this column and a reciprocable movable plate is cycled up and down therein. A spur gear and meshed pinion are provided therein. The spur gear is rotated by an arm and cam follower on the end thereof, with the cam follower transverse an angled cam track to provide a determined tilt and rate of tilt. A second and telescoping embodiment is also disclosed for conditions in which the lift may be as much as twelve feet or more. Side and front discharge apparatus is shown. Container securement apparatus includes adjustable pins. A clamping arrangement for cylindrical containers with a tapered end is also contemplated. A battery-powered apparatus is shown particularly for the telescoping apparatus.

26 Claims, 8 Drawing Sheets

APPARATUS FOR LIFTING AND TILTING DRUMS OF FLOWABLE MATERIAL

BACKGROUND OF THE INVENTION

1. Field of the Invention

With regard to the classification of art as established in and by the United States Patent Office, this invention is believed to be found in the general class entitled "Material of Article Handling," and particularly to the subclasses pertaining to rotating cradles which may have a non-fixed pivot. This apparatus is of the elevator type having a camming trackway.

2. Description of the Prior Art

Apparatus for lifting and turning drums, boxes and the like is well known as shown in prior patents. Representative thereof are: U.S. Pat. Nos. 732,459 as issued to STELTER on June 30, 1903; 1,492,675 as issued to CLARK et al on May 6, 1924; 2,388,987 as issued to MORRISON on Nov. 13, 1945; 2,870,927 as issued to WARREN on Jan. 27, 1959; 3,035,725 as issued to BEAMAN et al on May 22, 1962; 4,036,382 as issued to PERRY et al on July 19, 1977, and 4,348,147 as issued to HELM on Sept. 7, 1982.

The Stelter device is for dumping ashes and has a roller chain lift-over and the dump point with the guide being a curved tube. Clark is a modification and improvement of Stelter with an angled guide with roller means entering an arcuate quadrant to provide dumping. Morrison provides articulated levers for effecting the lift and dumping motion. Warren utilizes a dumbwaiter device and apparatus with a guide having an arcuate configuration to effect the dumping of the barrel. Beaman is for a dough bowl hoist and is a very specialized application. Perry is directed to handling bottle water and the apparatus used therewith is special for this problem. Helm utilizes paired and articulated arms and provides elaborate apparatus for high-level dumping.

In these patents, and as far as is known, a drum lifting and discharging apparatus, as hereinafter shown and described, is not shown or suggested. This novel apparatus of this invention provides for both mobile and fixed positioning. This apparatus provides adjustment for accommodating the height of the drum to be lifted and dumped. The lifting apparatus also has adjusting capability as well as u sing a pinion and meshed gear with a track and cam follower to provide a preselected rate and amount of actuation as well as the discharge rate and angle. This adjustability is very desirable when discharging chemicals.

SUMMARY OF THE INVENTION

This invention may be summarized, at least in part, with reference to its objects.

It is an object of this invention to provide, and it does provide, apparatus for controlled lifting and tilting of drums of flowable materials in which the apparatus may be mobile or fixed, with the lifting and tilting apparatus having a capability for adjusting the height of lift and degree of tilt.

It is a further object of this invention to provide, and it does provide, lifting apparatus having a drum-receiving guide and a pair of adjustably positioned retaining pins to accommodate the particular height of a drum or container of flowable material. The apparatus is adjustable as to the height of lift and rate and degree of tilt.

It is a further object of this invention to provide, and it does provide, lifting apparatus in which there is provided a safety latch providing means for preventing accidental lowering of the drum until emptied and lowering is desired.

It is still a further object of this invention to provide, and it does provide, lifting-and-tilting apparatus in which the tilting means is a track having a selectably directed gate providing means for an angle discharge of the lifted drum to one of two angles.

It is still a further object of this invention to provide, and it does provide, power lifting apparatus having a telescoping main body tube and utilizing a battery-powered drive unit for mobile operation and for a hydraulic-powered means for actuation of the grasp apparatus and lifting of the telescoping portion and the load.

In brief, this lifting-and-tilting mechanism is particularly adapted to the pharmaceutical field where drums of material of up to two hundred pounds are utilized. If desired, all exposed surfaces may be finished for easy removal of any and all dust. This apparatus may be air-actuated or, if desired, may be electrically actuated. A plurality of retaining pin locations is provided to accommodate drums or containers of selected heights. A pinion and meshed gear are utilized to provide the speed and degree of tilt for discharge of the opened drum. The cam track is provided with adjusting slots for raising or lowering this track and the rate and degree of tilt. This apparatus also provides a latch mechanism for preventing unwanted lowering of the lift mechanism, and in an alternate embodiment shows and describes a track and mechanism for selective tilting of the lifted drum to one of two discharge sides.

In a further alternate embodiment is shown a mobile apparatus powered by a storage battery. This battery power is used not only to move the apparatus and load, but is also utilized to actuate a hydraulic pump. This hydraulic system not only powers the grasp or gripping mechanism for the containers, but also provides fluid power to a lift cylinder so that the telescoping column may be raised from about seven to twelve feet. The grasping of the container is shown with two embodiments or means. These two embodiments depict front and side discharge arrangements.

In addition to the above summary, the following disclosure is detailed to insure adequacy and aid in understanding of the invention. This disclosure, however, is not intended to cover each new inventive concept no matter how it may later be disguised by variations in form or additions of further improvements. For this reason, there has been chosen a specific embodiment and alternates thereof are shown of a lifting-and-tilting apparatus for drums as adopted for use with flowable materials of powder, granules and the like, and showing a preferred means for constructing said mechanism. This specific embodiment has been chosen for the purposes of illustration and description as shown in the accompanying drawings wherein:

BRIEF DESCRIPTION OF THE DRAWINGS

In the following description and in the claims, various details are identified by specific names for convenience. These names are intended to be generic in their application. Corresponding reference characters refer to like members throughout the several figures of the drawings.

The drawings accompanying, and forming part of, this specification disclose details of construction for the purpose of explanation, but structural details may be modified without departing from the concept and principles of the invention and the invention may be incorporated in other structural forms than shown.

EMBODIMENT OF FIGS. 1 AND 2

Figure 1:
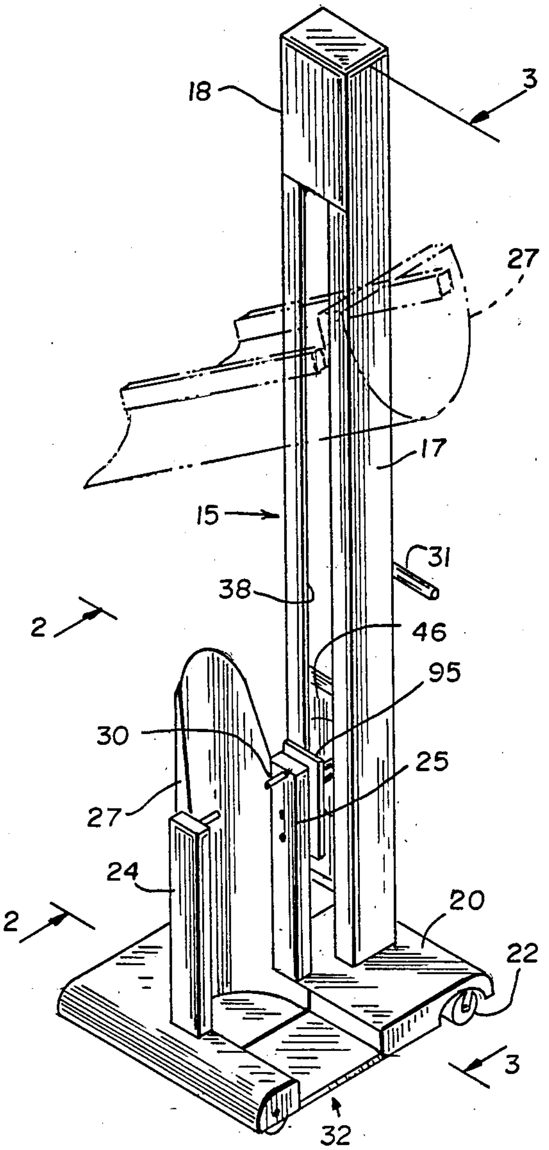
FIG. 1 represents a diagrammatic, isometric view of the apparatus for lifting and tilting drums of flowable material, this view showing mobile apparatus.
Figure 2:
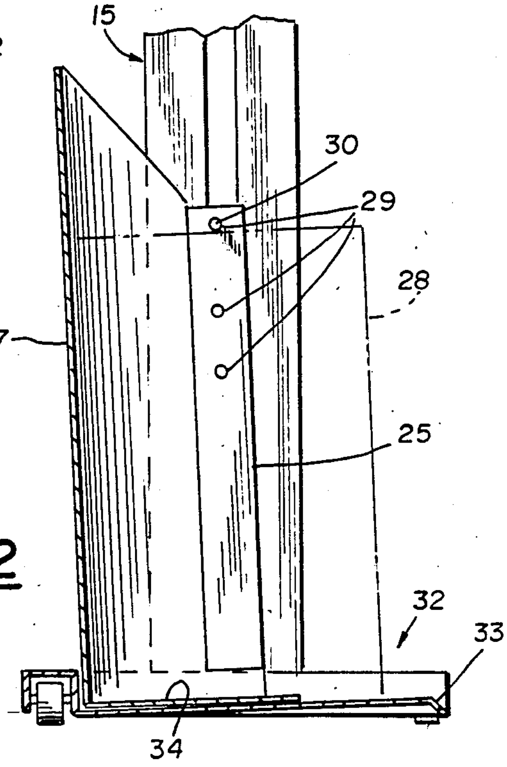
FIG. 2 represents a side view in an enlarged scale and showing a lower fragmentary portion of the diagrammatic showing of FIG. 1, this view taken on the line 2—2 of FIG. 1 and looking in the direction of the arrows.

Reference is made to the drawings and, in particular, to the diagrammatic showing of the preferred apparatus in FIGS. 1 and 2 wherein the general manipulator apparatus is identified as 15. A column 17 includes a top or cap portion 18 in which is a reversible motor (not shown) which may be pneumatic or may be an electrical gear motor. Within this top portion is usually a gear box or system that reduces the rotational speed of the motor to few rpms. The choice of actuation is a matter of selection and no patentable distinction is ascribed thereto. This column 17 is secured to a base support 20. This securing is usually be welding, but other means may be provided. This base support is shown with rollers 22 providing means for easy moving of the apparatus to a selected site. Extending upwardly from this base is a guide and support posts 24 and 25 which are spaced apart sufficiently for retention of a receiving and front-retaining curved support 27. This curved support is conventionally of sheet metal of a half circle, with the top portion contoured to provide a top supporting means when a drum 28 (shown in phantom outline) is lifted and rotated to discharge condition. A plurality of holes 29 at determined spacing provides selected securing of the top of drum 28 by pins 30. These retaining pins 30 are carried in the support posts 24 and 25 and are positioned so as to allow the drum to be slid thereunder, with these pins providing means for retaining the inserted drum during rotation. Also seen in FIG. 1 is handle means 31 providing for the attendant to move the apparatus to a desired position. Also seen in FIGS. 1 and 2 is an arcuate recess 32 having a ramp portion 33 and floor 34 terminating at or with curved support 72. It is to be noted that the floor area 34 is sloped downwardly from the ramp 33 toward the front curved support 27.

This apparatus, as shown in FIGS. 1 and 2, is anticipated to be mobile and manually moved from a pickup to a discharge area. Usually the drum or barrel used with this apparatus is less than two hundred pounds, and this apparatus provides a support surface for these transported drums. Usually the materials are granular or powder-like, and the angle for pouring discharge is adjusted to provide a slope for such materials. The drums are of selected sizes and all types of drums are involved and may be accommodated. Where and when the apparatus must be for prescribed use, such as pharmaceutical, the apparatus may be of stainless steel and with the exterior surfaces finished for such purposes.

EMBODIMENT OF FIGS. 3 AND 4

Figure 3:
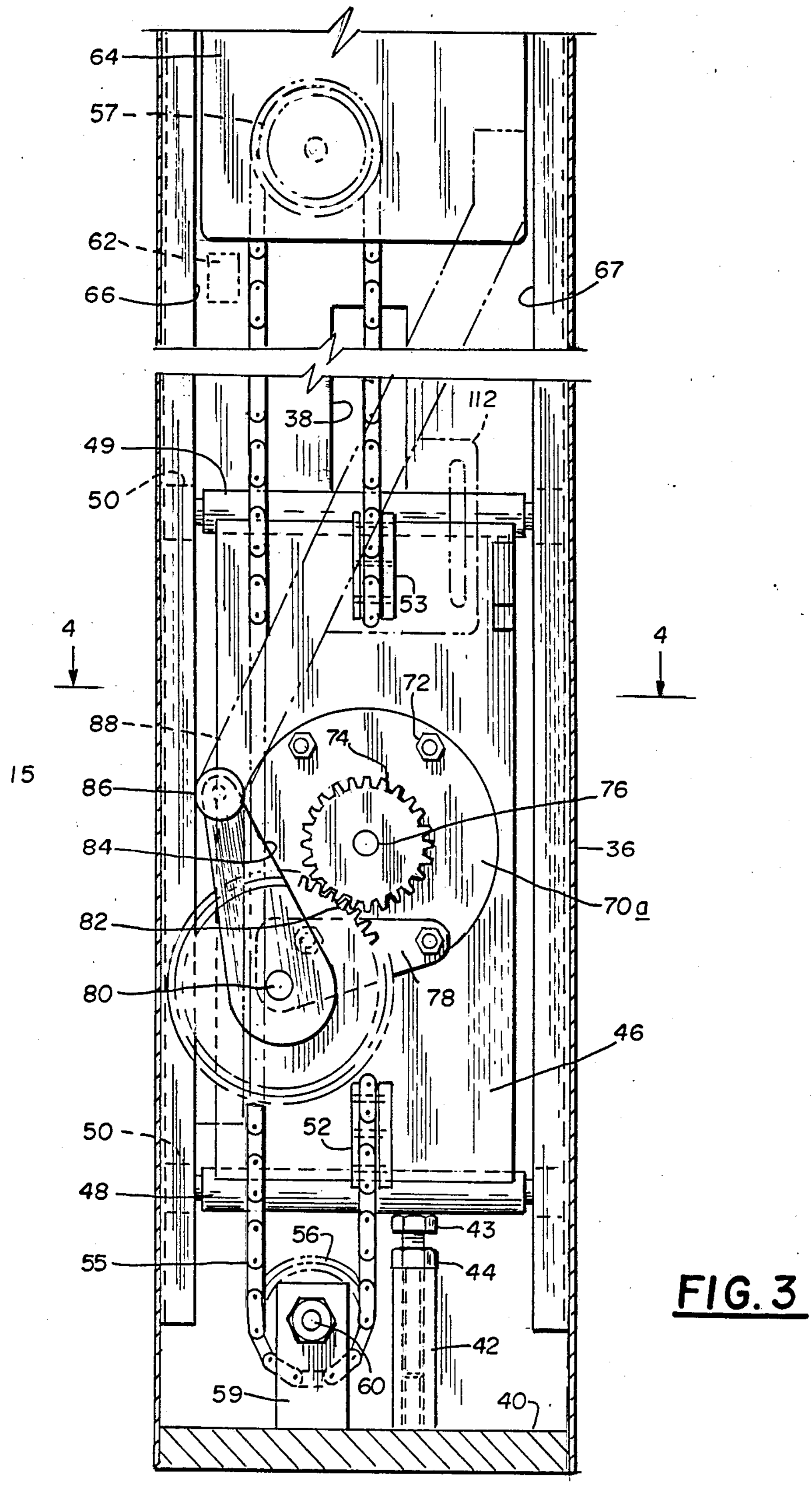
FIG. 3 represents a face view, partly diagrammatic and in enlarged scale, and showing the lifting-and-turning apparatus of this invention, this view broken so as to remove portions not essential to the operation thereof.

Referring to the column 15, as shown in FIG. 1, the view in FIG. 3 is rather diagrammatic to illustrate the upright column, identified as 15, as a rectangular tubing member 36 having a longitudinal slot 38 therealong. This slot is sufficient for the full extent of travel of the lift-and-tilt apparatus. Usually this slot is formed with square ends, but this is a matter of selection. This slot is of an extent to allow free passage of the lift-and-tilt member. A base plate 40 closes the bottom of tube 36 and, as depicted, carries a stop post member 42 having a threaded hole therein for retaining a cap screw and stop nuts 43 and 44. This screw and nuts 43 and 44 are adjusted to provide a lower travel limit of a vertically moved inner plate 46. This movable plate has lower and upper shaft members 48 and 49, each of which has cam followers 50 and the like mounted on each of the ends of a shaft. These cam followers are identified as 50 and have anti-friction capabilities so as to cause an expenditure of a minimum of energy. At each end of inner plate 46 is provided a block 52 or 53 adapted for attachment of an end of a roller chain 55. This roller chain is directed to and around lower and upper sprockets 56 and 57. The lower sprockets 56 is carried and freely rotates within a lower support bracket 59 in which shaft 60 is shown.

The upper sprocket 57 is carried and driven by a motor, not shown, and rotates clockwise and counterclockwise to raise and lower the plate 46 by moving the connected roller chain 55. Behind the portion of roller chain 52 extending upwardly from movable plate 46 is seen cutout 38. When the motor is electrical, a microswitch 62 may be secured to the back wall of column 36 of to the underside of upper support or header member 64. Where the actuation is pneumatic, a valve or like device may be utilized. This switch or valve may be provided where and when safety regulations require such devices. The upper and lower limits of travel are conventionally ascertained by automatically actuated controls. The tubular column 36 has two like channels 66 and 67 which are secured so as to face each other and provide guideways for a roller 50. These channels insure that the plate 46 travels in a more-or-less precise plane.

Carried on and secured to plate 46 is a flange member 70 b (shown in FIG. 4) attached by four cap screws 72 or bolts and nuts. A pinion 74 is fixedly secured to and carried on a rotatable shaft 76. A fixed support and plate member 78 is retained by the lower two bolts 72 and has an extending shaft 80 carried thereby. A spur gear 82 is in mesh with the piston 74 and is moved with and by arm 84. The distal end of this arm carries a cam follower 86 which is moved in a cam track 88, shown in phantom outline, as this track is carried on the near wall (not seen) in this view).

Figure 4:
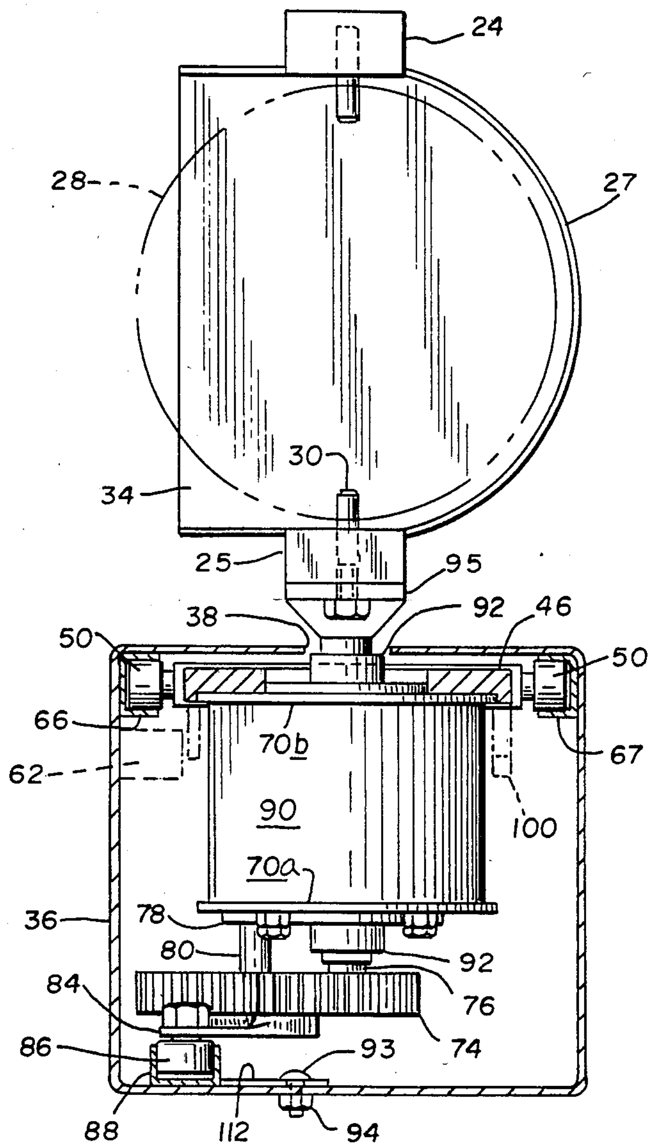
FIG. 4 represents a top or plan view of the mechanism of FIG. 3 and showing the relationship of the several components of the tilting mechanism.

In FIG. 4 is shown a plan view taken on the line 4—4 of FIG. 3 and diagrammatically depicts the turning apparatus of this invention. As seen, plate 46 is cut out to provide a seating recess for a flange member 70*b* which, as depicted, is the same diameter as front flange member 70*a*. A spacer 90 is shown and is sized to bring the meshed gear and pinion exactly into desired position and alignment. In FIG. 4, rollers 50 are depicted as guided and run in channels 66 and 67. Shaft 76 (identified in FIG. 3) is carried in and by anti-friction bearings 92, seen in FIG. 4. Roller 86 moves in channel 88 so as to transcribe the defined path of motion provided by this channel. This guideway is depicted as secured to the inner side of a wall of column 36 by bolts and nuts 93 and 94. As the roller 86 moves toward the side wall 36, the gear 82 also moves and is rotated correspondingly. The pinion 74 is also rotated in direct relationship to the differential of teeth. Shaft 76 is secured to an L-shaped bracket 95, as seen in FIG. 4. This bracket is secured to the inner post 25 so that elevation also produces the desired rotation of the drum 28. Pins 30 are also seen, as well as support 27 and pins 30. As seen in FIG. 4, it is noted that the drum 28 is supported at its bottom by plate or platform member 34 which is made with a squared-off configuration so as to provide a fit within the recess 32 of FIG. 1. It is to be noted that spacer 90 is of a length to suit the distance between the slotted wall ;and the diametrically opposite wall of the column 36.

LATCH MECHANISM OF FIG. 5

Figure 5:
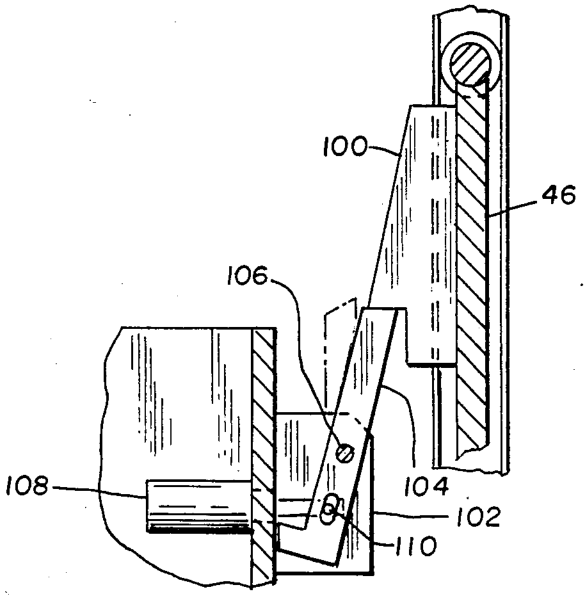
FIG. 5 represents a side view, partly diagrammatic and in section, and showing a safety latch that is used to prevent unwanted lowering of the tilting mechanism.
Figure 6:
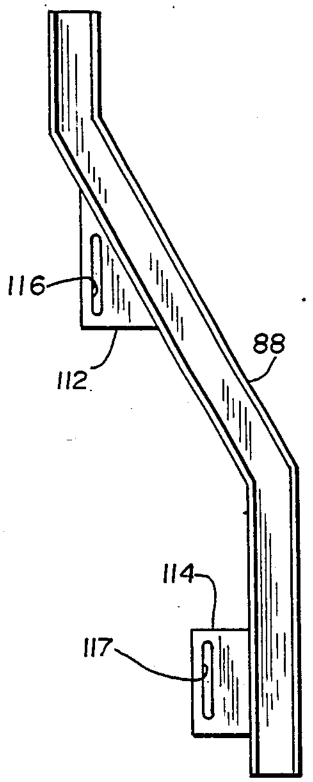
FIG. 6 represents a face view of the cam track for the articulation of the tilting mechanism.

In FIG. 5 is shown a latch mechanism that prevents unwanted downward movement of the mechanism carried by plate 46 until downward movement is desired. As a positive latch, a cam ramp member 100 may be secured to member 46 as by welding or the like. On a bracket 102 is pivotally carried a contoured latch 104 which is pivotally retained by a shaft 106. To move latch 104 from its engaging condition, an air cylinder or solenoid 108, when actuated, moves a pin 110 which causes the latch to be moved from the stop position (in solid outline) to a release condition suggested by the phantom outline position. Bracket 102 and cylinder 108 may be secured to the wall of column 36. A spring means, not shown, may be used to urge latch 104 into engaging position.

CAM TRACK OF FIG. 6

The formed channel cam track 88 is shown with attaching brackets 112 and 114. Bracket 112 is seen in phantom outline in FIG. 3. Bolts 93 and nuts 94 are employed to retain this track to the inside wall of tubular column 36. Slots 116 and 117 permit and provide adjusting means for moving the track 88 to a desired position.

CAM TRACK OF FIG. 7

Figure 7:
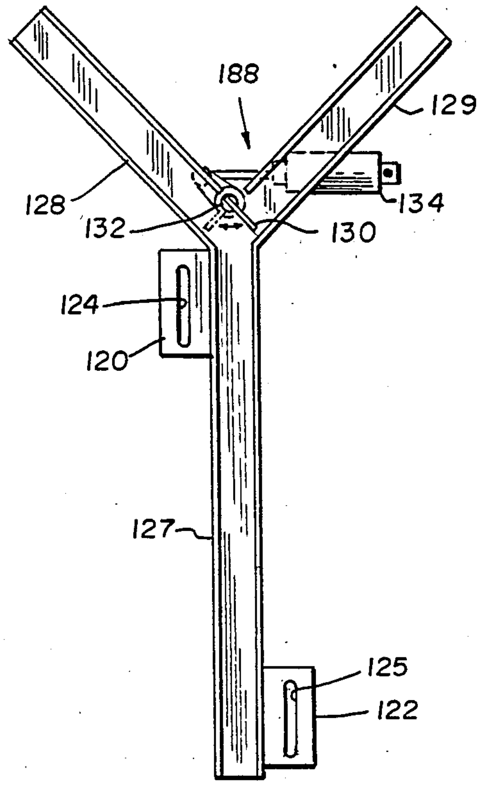
FIG. 7 represents a face view of a cam track having a Y-end and capability to selectively provide one of two tilt directions.

In FIG. 7 is depicted a cam track, generally identified as 188. Rather than an angle to only one side, the cam follower 86 may be caused to be moved to the right or left. Brackets 120 and 122 have slots 124 and 125 providing means for adjustably securing the track 188. A more-or-less vertical track portion 127 terminates at a "Y" where the left portion, identified as 128, is sized and disposed to receive the roller 86 of FIG. 3. In a like manner, the right portion 129 extends from the portion 127. A rotated guide member or deflector is carried by a pivot shaft 132 selectively moved in response to a signal sent to cylinder 134. This showing is merely illustrative of means to provide a discharge to either the right or left.

EMBODIMENT OF FIGS. 8 AND 9

Figure 8:
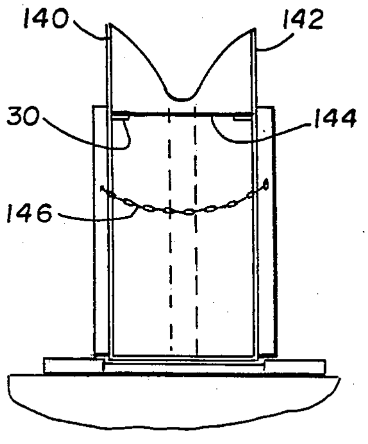
FIG. 8 represents a fragmentary view of the curved support of the drum for a pouring discharge in one of two selected directions.
Figure 9:
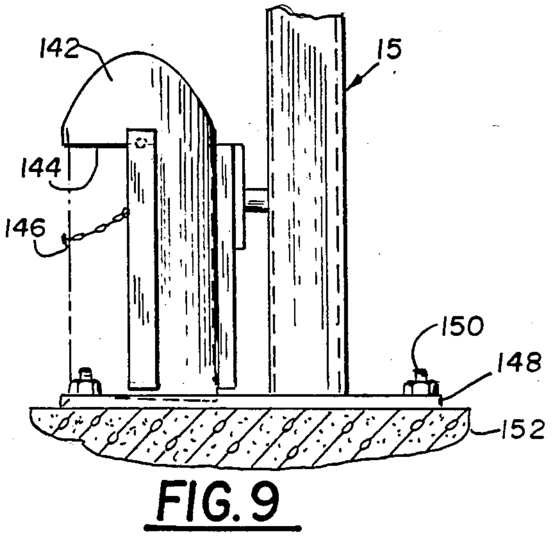
FIG. 9 represents the pouring discharge of FIG. 8 and showing the column secured to a base which is bolted to a floor.

In FIG. 8 there is fragmentarily shown a curved support for a pouring discharge of the drum to either the right or left. As shown, the curved support has two similar lip portions, identified as 140 and 142, providing left and right pouring guides. To provide pouring lip portions while permitting the sliding thereunder of drum 28, the top portions 140 and 142 are terminated at 144 (FIG. 9). Pins 30 are provided and, for possible dislodgement of the drum, a chain 146 may be provided. Also in FIG. 9 is shown the fixedly securing of column 15 and attached base 148 by bolts 150 in and to a concrete floor 152. FIGS. 8 and 9 are diagrammatic illustrations of alternate arrangements as the apparatus is made to suit customers' requirements.

EMBODIMENT OF FIG. 10

Figure 10:
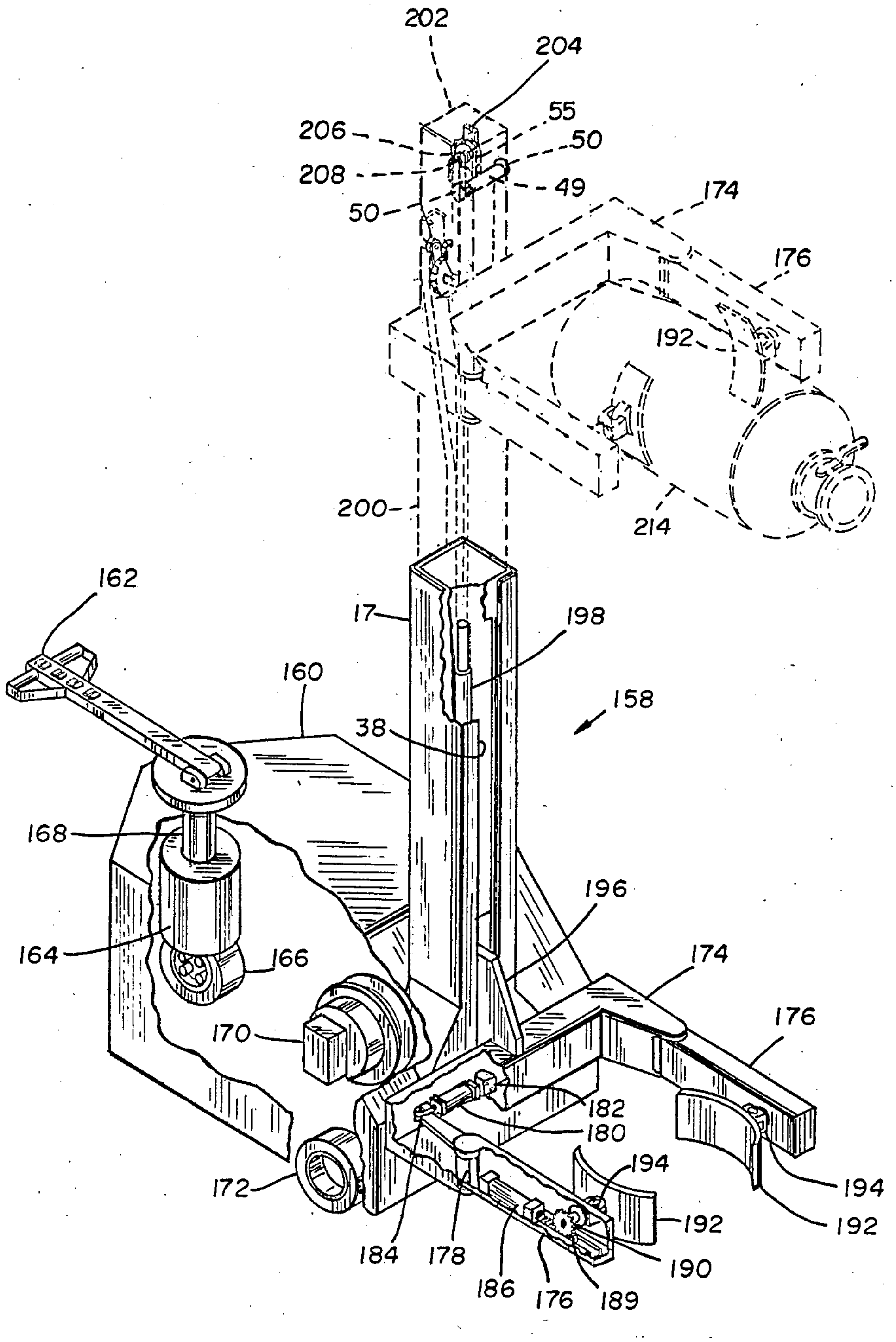
FIG. 10 represents a diagrammatic, isometric view of a telescoping apparatus for lifting and tilting a drum of flowable material, this view similar to that of FIG. 1, but utilizing a self-contained battery device and electrically-activated hydraulic pump, with this hydraulic power utilized for the telescoping actuation.
Figure 11A:
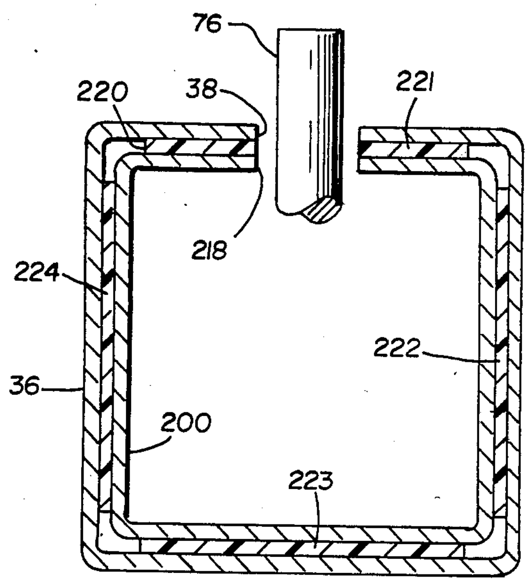
FIGS. 11 A, 11 B, 11 C and 11 D represent diagrammatic, sectional plan, side and top views showing in greater detail the telescoping apparatus of FIG. 10 and the novel components and uses thereof, FIG. 11 A showing the arrangement of the telescoping columns with anti-friction strips to provide a sliding capability, FIG. 11 B showing in detail a side view of the roller chain and lift cylinder used with the telescoping apparatus, FIG. 11 C illustrating a top or plan view of the apparatus of FIG. 10 arranged for a side discharge, and FIG. 11 D similar to FIG. 11 C but arranged for a front discharge actuation.
Figure 11D:
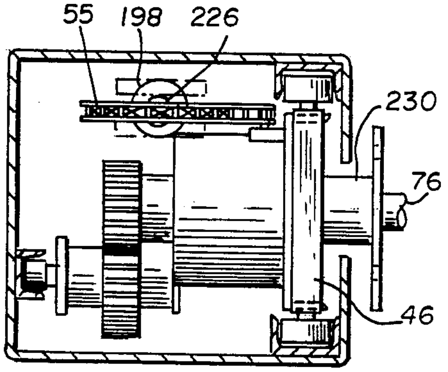
Figure 11C:
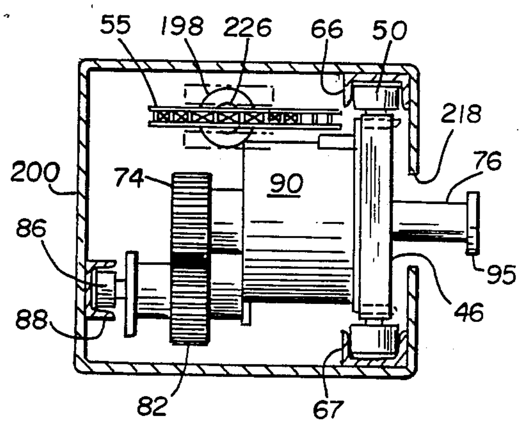
Figure 11B:
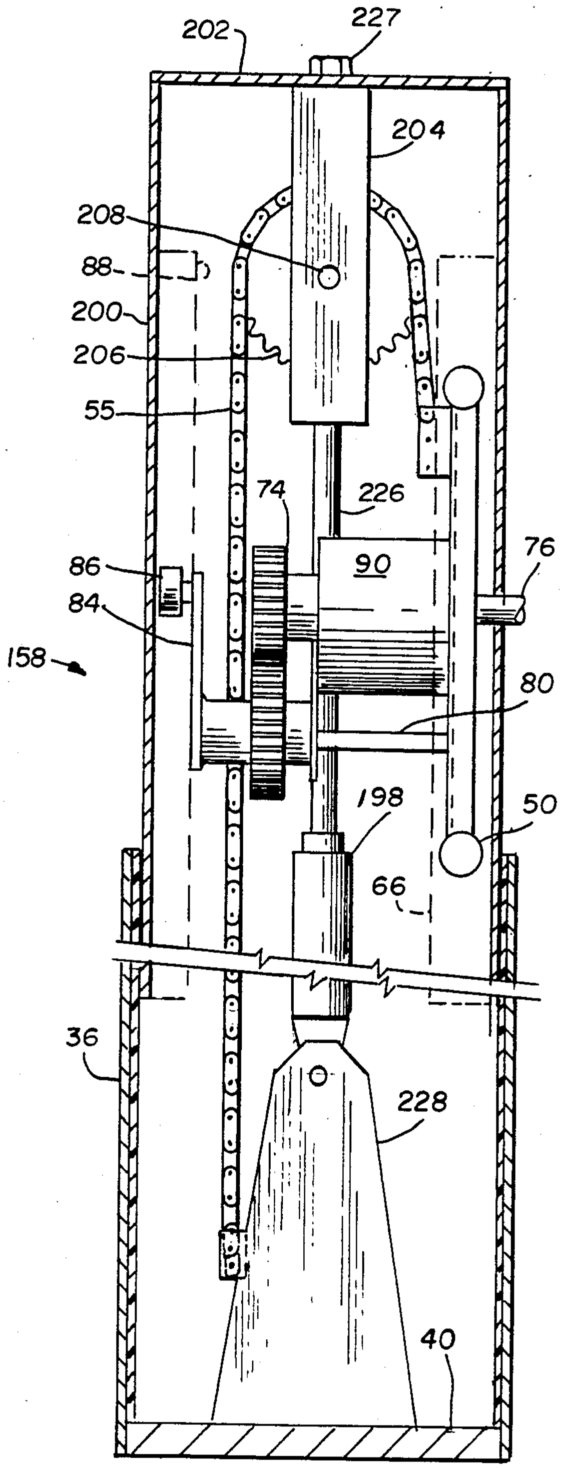

In FIG. 10 is depicted a telescoping apparatus, generally identified as 158, and embodying many of the concepts of the apparatus described and shown above. Rather than mobile apparatus which is manipulated by and with the manual effort of one attendant, this embodiment employs a battery power pack similar to that utilized in lift trucks. A body enclosure 160, usually of sheet metal, has a pivoted handle 162 with control switching means carried and accessible on the top. A battery and motor means 164 is shown and a drive wheel 166 is rotated by the motor 164 and is positioned as pivot shaft 168 is turned by handle 162. A hydraulic motor and sump is diagrammatically illustrated and identified as 170. This motor 170 provides pressurized hydraulic fluid which is caused to be conducted by high pressure hose means to operations for grasping, lifting and turning, as to be disclosed hereinafter. A pair of support wheels 172 is also provided on the body 160 which, in effect, provides a three-wheeled apparatus or device.

An elevating U-shaped arm 174 carries, on the ends of each "U" extension, a pivoted arm 176. These arms are mirror images of each other and, as pivotally retained, the left arm is a pivot or hinge 178 which is much like a clevis. Each arm 176 is moved inwardly and outwardly by a hydraulic cylinder 180, having one end fixedly retained by a block 182 which provides a limited pivoting actuation. The other end of cylinder 180 has a clevis end which is pivotally connected by pin means to the inner end of arm 176. This cylinder thus controls the pivoted movement of arm 176. Not shown, but provided in U-shaped arm 174, is another cylinder 180 and an associated arrangement of parts for pivotally moving the right arm 176.

Seen in the broken-away portion of the left arm 176 is another hydraulic cylinder 186 which, as shown, is secured to the inside wall of arm 176. This cylinder moves a rack 189 in and out to cause a meshed pinion 190 to be rotated. Arcuate-shaped gripper members 192 are carried by and on the ends of shafts 194. To provide and accommodate misalignment and positioning, these shaft ends are contoured and have apertures to receive a clevis fitting secured to and on the grippers 192.

The elevating U-shaped arm 174 has a gusset or rib 196 which is movable up and down as the upper telescoping portion is elevated. Seen in this view is lift cylinder 198 within the lower tubular column, which is like or substantially similar to the column 17 of FIG. 1. This rib 196 moves up and down in slot 38 provided and formed in this column. Another column portion is made slightly smaller and is slideable within the column 17. For the purpose of illustration and to prevent confusion, this inner column (identified as 200) is shown in phantom outline as it moves up and down. This column has a top cap 202 and, as depicted, a sprocket support and bracket 204 is fixedly attached to this cap 202 and has an extent sufficient for positioning a top roller chain sprocket 206 so as to be freely rotatable on a shaft 208 secured in support 204. Roller chain 55, as shown in FIG. 3, is directed to and around this sprocket 208. The outer end of this roller chain 55, as shown, is secured to the movable plate 46. The other end of this roller chain is secured to the base plate 40 (seen in FIG. 3). Shaft 49 carries rollers 50 on each end as described above. Channels 66 and 67 are provided and attached to the vertical wall of telescoping column 200. A slot 210 (FIG. 11 A) is provided in this column for the up-and-down movement of the rib 196 carrying the U-shaped arm 176 and the extending shaft providing for turnover and lift. Also diagrammatically shown are spur gear 82 and meshed pinion 74 as actuated by arm 84. This arm 84 is moved by cam follower 86 as it is moved in cam track 88. This is shown and described in detail in FIGS. 3 and 4 above.

In the upper portion of this FIG. 10, the spacer 90 is utilized to position the cam follower 86, track 88 and U-channels 66 and 67, which are secured to the slot side of and on the upper telescoping portion 200. The roller chain 55, rather than being attached to plate 46 as shown in FIG. 3, is attached at its lower end to the base 40 for the lower fixed column. This chain 55 extends upwardly to sprocket 206, thence downward to attachment to plate 46. Hydraulic cylinder 198 is adapted to engage and lift the inner column 200. As this column is lifted, the top 202 is also raised and U-shaped bracket 174 is lifted as sprocket 206 is lifted and rotated, resulting in a like lift of the U-shaped arm 174. It is noted that a cylindrical container 214 is depicted and that a closed end and cap 216 is shown as a portion of this container.

EMBODIMENT OF FIG. 11 A

FIG. 11 A is a plan view, quite diagrammatic, and showing the lower tubular member 36 formed with a slot 38 therein. The inner tubular column 200 is formed with a slot 218 therein and is aligned with slot 38. This inner tubular member is slideable within the outer tubular column 36 and, to prevent binding or galling, anti-friction spacing materials are provided. Strips 220, 221, 222, 223 and 224 are depicted. Conventionally, these strips are Teflon (TM DuPont) or the like, but this is not to preclude the use of other materials such as impregnated cloth and the like. The positioning and extent of these anti-friction materials is a matter of selection. It is noted that the corner portions are omitted so as to reduce fitting and repair problems. Shaft 76 and bearings 92 (FIG. 4) are contemplated to be provided in this embodiment.

EMBODIMENT OF FIG. 11 B

In FIG. 11 B, the turnover mechanism is shown in a side view with gear 82 and pinion 74, shaft 80, arm 84 and with cam follower 86 represented as traveling in track 88. Output shaft 76, spacer 90, pinion shaft 80, plate 46, rollers 50 and channel guides 66 are also identified. It is to be noted that plate 46 and the associated turnover mechanism is carried within the upper telescoping member 200. Cylinder 198 is shown with a piston rod 226 which, at its upper end, is secured to bracket or block 204. A cap screw 227 is shown as retaining the bracket 204 to the cap 202. The cylinder 198 is provided at its lower end with a clevis fitting (conventional) for mounting to a fixed support 228 attached to the base plate 40. Roller chain 55 is shown with one end attached to this fixed support, but this is merely a matter of preference and no patentable distinction is ascribed thereto.

EMBODIMENT OF FIG. 11 C

In FIG. 11 C, there is depicted a plan view of the telescoping apparatus of FIG. 10 and showing mechanism for a side discharge of the container. This top view depicts the telescoping tube in a diagrammatic showing of the outer column 200 with slot opening 218 and through which shaft 76 projects to bracket or chute-attaching plate 95. Interior are illustrated track 88, roller 86, gear 82, pinion 74 and spacer 90. The movable plate 46 carries rollers 50 and is moved by roller chain 55 and by cylinder 198 as identified above.

EMBODIMENT OF FIG. 11 D

In FIG. 11 D, the view of FIG. 11 C is repeated except that, instead of a side discharge, there is provision for a front discharge. As seen, a tubular support for the U-shaped arm 174 is attached to movable plate 46. A collar or tube portion 230 has the inner end secured to plate 46 and the outer end carries plate 232. Shaft 76 is rotated as pinion 74 is rotated.

EMBODIMENT OF FIGS. 12, 13 AND 14

Figure 12:
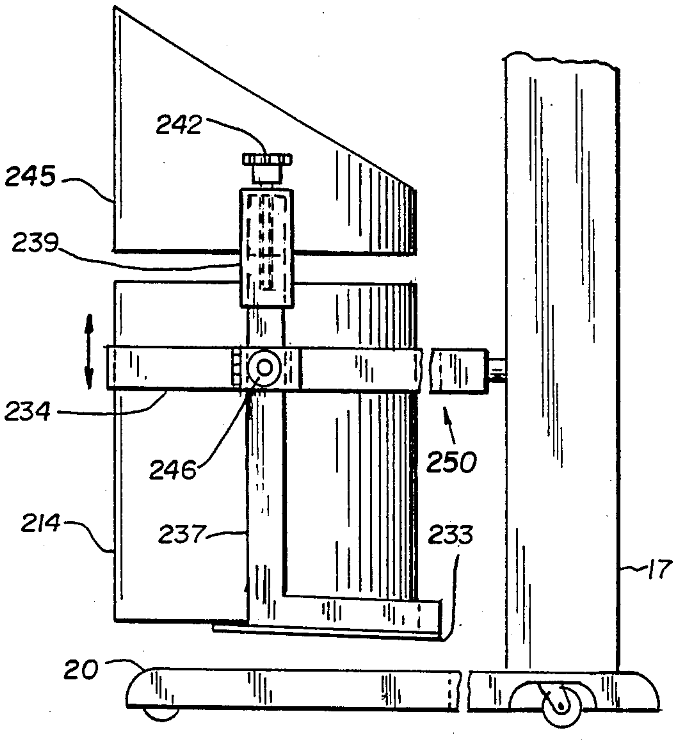
FIG. 12 represents a diagrammatic side view showing a lift-and-tilt device as arranged for a front discharge of the container, this view very diagrammatic and illustrating only that apparatus needed for front discharge.
Figure 13:
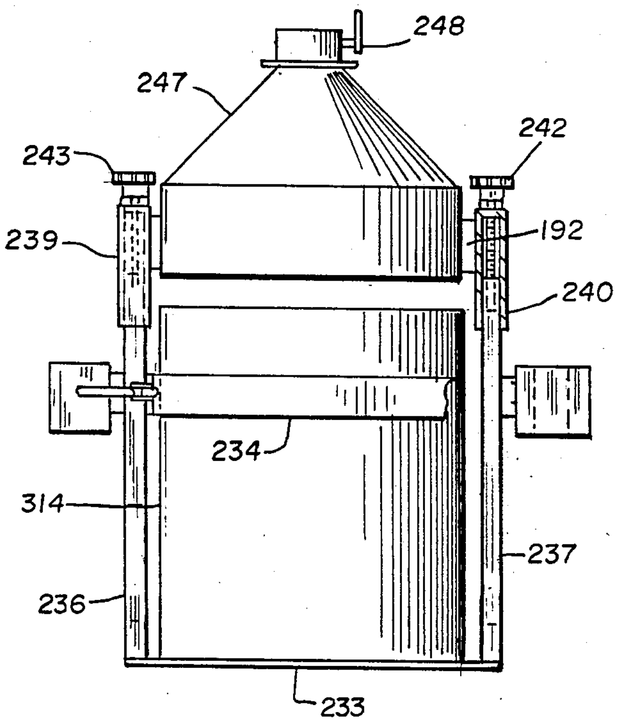
FIG. 13 represents a fragmentary and diagrammatic face or front view of that band clamp apparatus as shown in FIG. 12.

In FIGS. 12 and 13 are diagrammatically shown side and plan views of container-grasping-and-manipulating means providing front dumping actuation. In FIG. 12, the apparatus is substantially as shown in FIGS. 1, 2, 3 and 4 but, rather than side tilting and dumping, there is provided front dumping away from the column 17 as in FIG. 1. Base 20 and column 17 are similar, if not identical, to those described above. Rather than the support 27 and floor 34 of FIGS. 1 and 2, there are provided a floor member 233 and a hinged band, generally identified as 234. In the embodiment of FIG. 12, container 214 is depicted as a container having a top rim so that a pin 30 (as seen in FIGS. 1 and 2) may be utilized to retain the top rim portion of a container. A forward discharge requires band retention as the container 214 is tilted towards an open or entering side. The inner portion 235 of this band is shown in the plan view of FIG. 14. An outer strap portion is hingedly retained by a pin 236 at one end, and at the other is provided with a latch that is selectively retained by a clamp 237. At the mid-point of this hinged band 234 are provided two oppositely disposed vertical portions 238 and 239. It is to be noted that the lower retainer member 233 is adapted to receive and retain the bottom rim of a container 214 like that shown in FIG. 10. The bottom rim of the container is seated in and carried by said lower retainer 233 which is adapted to receive a container when brought thereto. Base 20 may be contoured to allow container 214 to rest on the floor. The retainer 233 is made integral with, or otherwise fixedly secured to, the vertical portions 238 and 239. These vertical portions 238 and 239 have upper portions 241 and 242 slideable, respectively, on said vertical members. Each of these upper portions 241 and 242 is threaded for the threaded shank portions of adjusting knob screws 243 and 244.

Knobs 243 and 244 are manipulated to draw front-discharge lip or chute 245 downwardly to the top of container 214. Pins 20 provide means for top retention of the container. Not seen in the view of FIG. 12 is a securing means for fixedly retaining chute 245 to the upper portions 241 and 242 so that as the portions are adjusted downwardly the chute 245 is drawn to the top of th e container. This arrangement is contemplated for powders, granules and the like. It is to be noted that a broken connection is shown. The distance of column 17 from the container is determined by the anticipated length of the container 214 and the arc of swing required as the distance from pivot pins 246 to the inside of the vertical tube portion 17. The container 214 and chute 245 swing in an arc so interference of retainer member 233 with the band apparatus is avoided and not contemplated.

It is also contemplated that this apparatus may be used for fluid material, and FIG. 13 shows such a container which, for the purpose of differential identification, is numbered 314. The apparatus of FIG. 12 is used except that chute 245 is not required or desired. Container 314 is shown as having a conical end 247 and a manipulatable valve 248 providing means for controlled discharge. The conical container and valve are for fluids or materials which are fluid-like in their pour and control.

Figure 14:
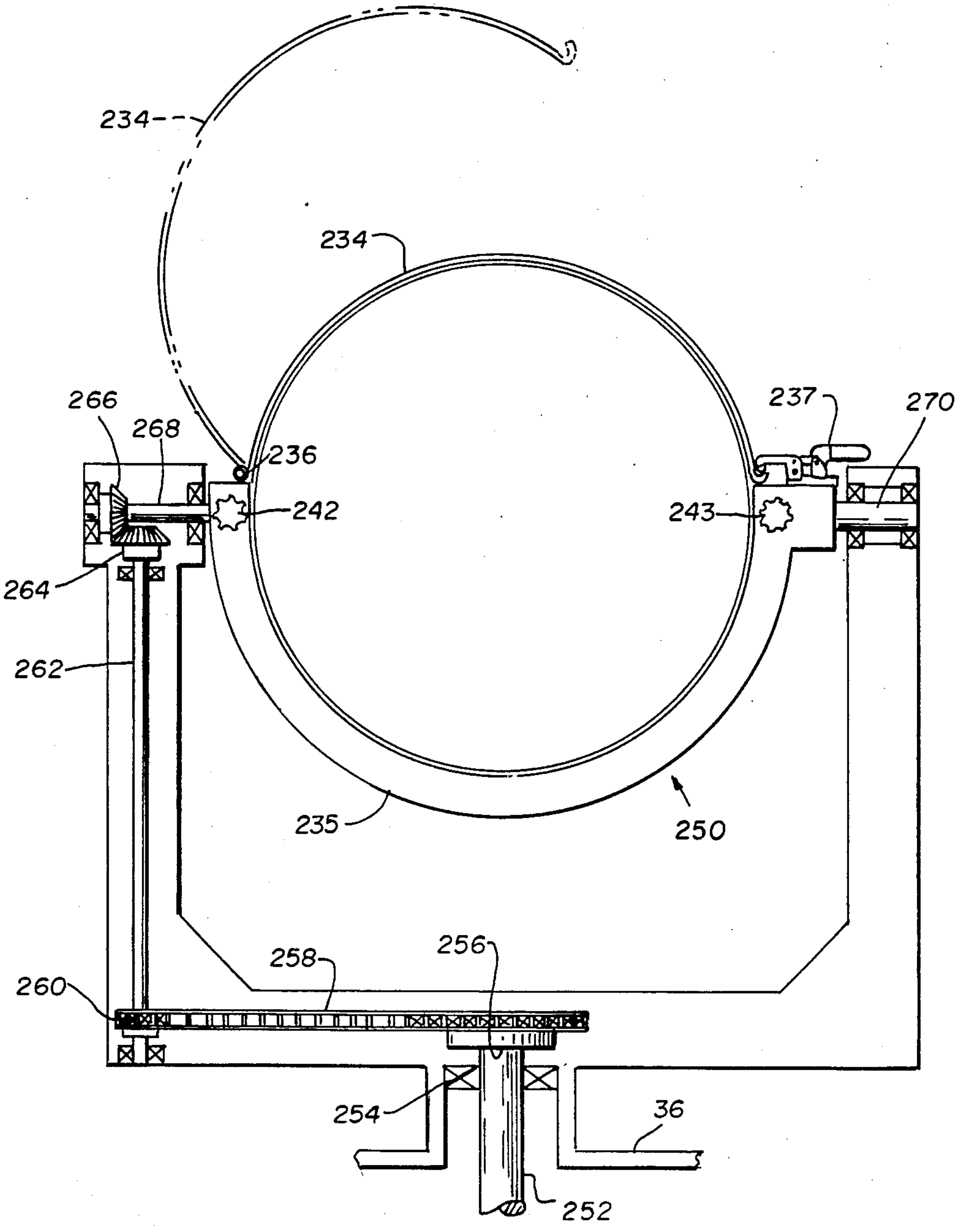
FIG. 14 represents a plan view, partly diagrammatic and fragmentary, and showing drive means for a front discharge using the arrangement of FIGS. 12 and 13.

In the plan view of FIG. 14, there is shown a U-shaped support bracket 250 which is moved up and down, but does not and is not rotated as is done in FIG. 4. In this view is seen a drive shaft 252 carried in bearing 254 in the retainer 36. This retainer is movable in the slot 38 in tubular column 36. As diagrammatically seen, at the end of shaft 252 is a secured sprocket 256. This sprocket drives a roller chain 258 which rotates a driven sprocket 260. This sprocket 260 rotates a shaft 262, having at its distal end a bevel gear 264. This bevel gear meshes with and rotates bevel gear 266 which rotates shaft 268. An opposite idler shaft 270 carries the other end of hinged band 234. Shaft 268 provides the limiting rotation of the band 234 and the retained container 214. The idler shaft 270 has no influence over the rotation and speed.

The apparatus shown in FIGS. 12, 13 and 14 are directed to front discharge of the container contents. These embodiments may be modified to suit customers' anticipated use. This tilting and discharge is contemplated to be used with the apparatus of FIG. 1, FIG. 2 and the telescoping apparatus of FIG. 10. This application and drawings have been described carefully to illustrate the novel lift-and-tilting devices.

The novel lifting-and-tilting mechanism disclosed and described above also suggests a method of providing such actuations. This method insures that as the container of flowable materials is lifted and tilted to an established angle sufficient to discharge the material, a controlled means and motion are established. This method includes the steps of:

providing a column and attaching to a base support, and positioning said column in a substantially vertical attitude;

forming a slot in this column and providing an access opening to the interior of said column, this slot extending for much of the length of this column;

arraying a container support having a bottom portion adapted to receive and retain the weight of the container;

retaining the container in the placed condition during lift and tilting of the container;

positioning a movable plate within the tubular column, and securing to this plate cam follower-type rollers;

attaching U-shaped channel members to the column, these members providing retaining guideways for the cam-follower rollers on the movable plate so that said plate may be cycled up and down the column;

providing a pinion and meshed spur gear and carrying said spur gear and pinion on and by said movable plate, and fixedly carrying the pinion on a rotatable output shaft, with the end portion of said shaft extending through said slot and adapted for securing to the container support, and carrying the spur gear on another shaft and rotatable thereon;

selectively actuating a lift-and-lowering means adapted to move the movable plate and the rollers thereon in the U-shaped tracks, and attaching the lifting-and-lowering means to the movable plate;

securing an arm to said spur gear so as to move said spur gear as the arm is moved, and rotatable mounting to and on said arm a cam follower-type roller;

attaching a cam track to the column and with said cam track adapted to receive and retain said roller on the end of the arm associated with the spur gear, and providing on this cam track an angled portion adapted to engage the cam follower and cause the spur gear to be rotated a determined amount, this motion causing rotation of the spur gear and meshed pinion so that a determined rotation of the pinion shaft is made, and attaching the output shaft to said container support so that in the lift of the movable plate the secured container is lifted and, when the roller on the end of the arm associated with the spur gear is moved in the cam truck, said container support and the retained container are tilted to a discharge position, and the lowering motion of the movable plate is adapted to bring the now emptied container and support to the "start" condition and position.

Terms such as "left," "right," "up," "down," "bottom," "top,", "front," "back," "in," "out," "clockwise," "counterclockwise" and the like are applicable to the embodiments shown and described in conjunction with the drawings. These terms are merely for the purposes of description and do not necessarily apply to the position in which the apparatus for lifting and tilting drums of flowable material may be constructed or used.

While a particular embodiment of the apparatus and alternate embodiments have been shown and described, it is to be understood that the invention is not limited thereto and protection is sought to the broadest extent the prior art allows.

What is claimed is:

1. Apparatus for lifting and tilting a drum and like containers of flowable materials brought to a lift device whereat the container is lifted to a desired height above the floor, and during said lift a determined tilt is made to an established angle at which the material in the container is discharged, this apparatus including:

(a) a base support;

(b) a tubular column arrayed in a substantially vertical attitude and secured to said base support;

(c) a slot formed in this column and providing an access opening to the interior of said column, this slot extending for much of the length of this column;

(d) a container support having a bottom portion adapted to receive and retain the weight of the container;

(e) means for retaining the container in a placed condition on the container support during lift and tilting of the container;

(f) movable plate positioned within the tubular column, this plate having cam follower-type rollers secured to the plate;

(g) U-shaped channel members attached to the column and providing retaining guideways for the cam-follower rollers on the movable plate so that said plate may be cycled up and down the column;

(h) a pinion and meshed spur gear carried on and by said movable plate, the pinion fixedly carried on a rotatable output shaft, with the end portion of said shaft extending through said slot and adapted for securing to the container support, and the spur gear carried on another shaft and rotatable thereon;

(i) a selectively actuated lift-and-lowering means adapted to move the movable plate and the rollers thereon in the U-shaped tracks including a reversible pneumatic motor having an output shaft on which is mounted a roller chain sprocket which is adapted to cycle a roller chain therein, the roller chain arranged so that both ends are attached to the movable plate, and means attaching the lifting-and-lowering means to the movable plate;

(j) an arm secured to said spur gear so as to move said spur gear as the arm is moved, and said arm having a cam follower-type roller thereon;

(k) a cam track secured to the column and adapted to receive and retain said roller on the end of the arm associated with the spur gear, this cam track having an angled portion adapted to engage the cam follower and cause the spur gear to rotate a determined amount, this motion causing rotation of the spur gear and meshed pinion so that a determined rotation of the pinion shaft is made, (l) means attaching the output shaft to said container support so that during the lift of the movable plate the secured container is lifted and, when the roller on the end of the arm associated with the spur gear is moved in the cam track, said container support and the retained container are tilted to a discharge position, and the lowering motion is adapted to bring the now emptied container and support to the "start" condition and position; and (m) the end of the tubular column being closed by a base plate on which is secured a bracket adapted to rotatably retain a second roller chain sprocket which is disposed to carry and redirect the roller chain attached to the movable plate, and the base plate carrying a secured stop post having adjusting means to limit the downward movement of the movable plate.

2. Apparatus for lifting and tilting a container as in claim 1 in which the cam track which is mounted to said column is attached to that wall opposite the slot and with this track having a substantially vertically disposed portion after the angled portion, this substantially vertically disposed portion adapted to retain the tilted attitude of the container during discharge and the determined lift.

3. Apparatus for lifting and tilting a container as in claim 1 in which said base support is provided with rollers so disposed that said apparatus may be moved and is movable to a selected position.

4. Apparatus for lifting and tilting a container as in claim 3 in which there is provided handle means attached to the column which provides attendant assist means for manipulation of the apparatus.

5. Apparatus for lifting and tilting a container as in claim 1 in which the base support is adapted for fixed securement to a floor portion in which the apparatus is used.

6. Apparatus for lifting and tilting a container as in claim 1 in which the container support includes an arcuate wall portion having one end contoured to provide a delivery chute portion disposed to receive and provide a flow path for delivery of fluent materials to receiving means, and the means for retaining the container includes substantially opposed pins disposed to slideably engage the top rim of said container during tilting and discharge of the fluent materials.

7. Apparatus for lifting and tilting a container as in claim 6 in which the opposed pins are adjustably positioned in holes formed in side posts, which posts are also adapted to retain the arcuate wall portion of the support.

8. Apparatus for lifting and tilting a container as in claim 1 in which the spur gear is carried on and is rotatable on a shaft secured to a plate, this plate and shaft so configured and positioned that the spur gear, when it is brought to a meshed condition, utilizes the ratio of teeth in the spur gear and the pinion to establish the degree and speed of tilt of the container.

9. Apparatus for lifting and tilting a drum and like containers of flowable materials brought to a lift device whereat the container is lifted to a desired height above the floor, and during said lift a determined tilt is made to an established angle at which the material in the container is discharged, this apparatus including:

(a) a base support;

(b) a column arrayed in a substantially vertical attitude and secured to said base support;

(c) a slot formed in this column and providing an access opening to the interior of said column, this slot extending for much of the length of this column;

(d) a container support having a bottom portion adapted to receive and retain the weight of the container;

(e) means for retaining the container in a placed condition on the container support during lift and tilting of the container;

(f) a movable plate positioned within the tubular column, this plate having cam follower-type rollers secured to the plate;

(g) U-shaped channel members attached to the column and providing retaining guideways for the cam-follower rollers on the movable plate so that said plate may be cycled up and down the column;

(h) a pinion and meshed spur gear carried on and by said movable plate, the pinion fixedly carried on a rotatable output shaft, with the end portion of said shaft extending through said slot and adapted for securing to the container support, and the spur gear carried on another shaft and rotatable thereon;

(i) a selectively actuated lift-and-lowering means adapted to move the movable plate and the rollers thereon in the U-shaped tracks, and means attaching the lifting-and-lowering means to the movable plate;

(j) an arm secured to said spur gear so as to move said spur gear as the arm is moved, and said arm having a cam follower-type roller thereon;

(k) a cam track secured to the column and adapted to receive and retain said roller on the end of the arm associated with the spur gear, this cam track having an angled portion adapted to engage the cam follower and cause the spur gear to rotate a determined amount, this motion causing rotation of the spur gear and meshed pinion so that a determined rotation of the pinion shaft is made, the cam track made with a Y-shaped track guide portion providing for right and left movement of the cam follower in said track guides so as to provide a selected discharge attitude, and a selectively actuated diverter means adapted for opening one of the track guide extents to provide a selected discharge position, and (l) means attaching the output shaft to said container support so that in the lift of the movable plate the secured container is lifted and, when the roller on the end of the arm associated with the spur gear is moved in the cam track, said container support and the retained container are tilted to a discharge position, and the lowering motion is adapted to bring the now emptied container and support to the "start" condition and position.

10. Apparatus for lifting and tilting a container as in claim 9 in which the diverter includes a plate-like member carried on and by a rotatable shaft, with said plate-like member disposed to be moved so as to be in the way of the cam follower as the arm, with the plate-like member moved to selected predetermined limits by reciprocable cylinder actuated in response to a signal means.

11. Apparatus for lifting and tilting a container as in claim 9 in which the container as carried by the support includes an arcuate wall portion having a delivery chute portion with two lip portions as mirror lip portions disposed at substantially opposite positions, the upper extent of this wall portion having a cut-off so that the container may be slid thereunder, this support also including a chain-like retaining means disposed to extend across the opening, and the upper rim of the container being retained by pins inserted in side posts.

12. Apparatus for lifting and tilting a container as in claim 1 in which there is provided a safety latch disposed in engage and retain the lifted mechanism at its upper lift position and during discharge, and including means for actuation of said safety latch so as to allow the now emptied container and support to be returned to a "start" position.

13. Apparatus for lifting and tilting a container as in claim 12 in which the means for actuation of the latch for the release thereof is by a pneumatic means.

14. Apparatus for lifting and tilting a container as in claim 1 in which the discharge of the fluent materials is arranged for a front discharge in which the container is tilted from substantially axial alignment with the column to a discharge position which is more than ninety degrees from a theoretical center line of the column.

15. Apparatus for lifting and tilting a container as in claim 14 which includes a band providing flexible securement of said container to said container support and with retention of the end of said band to the container support, and pivotally mounting said support so this support may be swung with the container therein absent interference with the column, and with the container support having a discharge chute with a contoured discharge, said chute carried by adjusting means so as to be selectively moved to a contiguous relationship with the top rim of the container of fluent materials.

16. Apparatus for lifting and tilting a container as in claim 15 in which the discharge chute is carried by opposed upper portions slideable on vertically disposed portions secured to the floor member, these slideable portions adjusted to a desired position to screw means.

17. Apparatus for lifting and tilting a container as in claim 14 in which the container is disposed for fluid, or substantially fluid, materials, with said container having a conical and portion with a manipulatable valve at the small end of the conical portion, the container retention means including a band providing securing means during pivotal swinging of the container from a substantially vertical condition to a tilted discharge condition.

18. Apparatus for lifting and tilting a container as in claim 14 in which a front discharge is provided and wherein the apparatus further includes a U-shaped arm support so that the output shaft from the pinion extends from the column sufficiently for the mounting thereon of a roller chain sprocket adapted to receive and move an endless roller chain which is retained on and drives a second roller chain sprocket which is carried on a shaft disposed in an extending arm of the U-shaped arm support, this shaft carrying on its distal end a drive bevel gear, and in meshed contact with said drive bevel gear is a meshed driven bevel gear which is carried on a shaft providing a pivot support of a U-shaped bracket contoured to receive and retain substantially one-half of the periphery of the container and the U-shaped bracket pivotally supported by an idler shaft, this U-shaped bracket also having a band postion adapted to engage and retain that peripheral portion of the container not engaged and retained by said U-shaped bracket, this band having securing means for retaining the container during lift and tilting of the container.

19. Apparatus for lifting and tilting a container as in claim 18 in which the band is of metal and is hinged at one end and adapted to be retained by selectively actuated clamp means at the other end of the band.

20. Apparatus for lifting and tilting a drum and like containers of flowable materials brought to a lift device which includes a telescoping column and whereat the container is lifted to a desired height above the floor, and during said lift a determined tilt is made to an established angle at which the material in the container is discharged, this apparatus including:

(a) a base support and a first tubular column, said first column arrayed in a substantially vertical attitude and secured to said base support;

(b) a second tubular column configured so as to be slideably positioned within said first column;

(c) a slot formed in each of these tubular columns, this slot providing an access opening to the interior of said columns, this slot extending for much of the length of these columns;

(d) a container support having a bottom portion adapted to receive and retain the weight of the container;

(e) means for retaining the container in a placed condition on the container support during lift and tilting of the container;

(f) a movable plate positioned within the second tubular column and moved as this second column is moved, this plate having cam follower-type rollers secured to the plate;

(g) U-shaped channel members attached to the second column and providing retaining guideways for the cam-follower rollers on the movable plate so that said plate may be cycled up and down the second column;

(h) a pinion and meshed spur gear carried on and by said movable plate, the pinion fixedly carried on a rotatable output shaft, with the end portion of said shaft extending through said slot drivingly secured to the container support, the spur gear being carried on another shaft and rotatable thereon;

(i) a selectively actuated lift-and-lowering means which includes a hydraulic cylinder secured to and supported by a base plate in the first tubular column and with this cylinder having a rod end secured to a support carried by and fixed to a top cap portion of the second tubular column, this hydraulic cylinder adapted to move the movable plate and the rollers thereon inthe U-shaped tracks, and means for attaching the lifting-and-lowering means to the movable plate;

(j) an arm secured to said spur gear so as to move said spur gear as the arm is moved, and a cam follower-type roller rotatably mounted to said arm;

(k) a cam track attached to said second column, said cam track being adapted to receive and retain said roller on the end of the arm associated with the spur gear, said cam track including an angled portion adapted to engage the cam follower type roller to cause the spur gear to be rotated a determined amount, this motion causing rotation of the spur gear and meshed pinion so that a determined rotation of the pinion shaft is made; and (l) the output shaft being attached to said container support so that in the lift of the movable plate the secured container is lifted and, when the roller on the end of the arm associated with the spur gear is moved in the cam track, said container support and the retained container are tilted to a discharge position, and the lowering motion of the movable plate is adapted to be moved from the second to the first column so as to bring the now emptied container and support to the þstart" condition and position.

21. Apparatus for lifting and tilting a container as in claim 20 in which the lift-and-lowering means includes a fixed support attached to the base plate, this support formed to provide a clevis retainer for said hydraulic lift cylinder and with the cylinder having a cylinder rod which is attached to a sprocket support fixed to said top cap, and with a roller chain having one end secured to components associated with the first column, with this roller chain directed to and around a sprocket rotatably carried in said sprocket support and with the other end of this roller chain secured to the movable plate.

22. Apparatus for lifting and tilting a container as in claim 21 in which there is a plurality of anti-friction strips between selected inner surfaces of the first column and outer surfaces of the second column, said strips so placed and secured that relative motion of the second column in and out of the first column provides a sliding capability, preventing unwanted binding.

23. Apparatus for lifting and tilting a container as in claim 21 in which the telescoping apparatus is adapted to add about seven feet to the lift capability of the lift and turn of the retained container.

24. Apparatus for lifting and tilting a container as in claim 21 in which the telescoping apparatus includes a battery-powered drive means and a power-driven guide wheel and with this battery power utilized to actuate a hydraulic pump and sump having an output so that pressurized hydraulic fluid may be selectively fed to that lift cylinder used to move the second column in a lift-and-lower actuation, and the container retainer has a channel configuration, and there is also at least one additional hydraulic cylinder which uses this pressurized hydraulic fluid for selective movement of an associated pivoted arm and an arcuate clamp thereon towards and away from a like arm and arcuate clamp.

25. Apparatus for lifting and tilting a container as in claim 24 in which the lift-and-tilt apparatus includes a channel-shaped retainer portion in which the first additional hydraulic cylinder is carried in the flange portion and the arm portion is pivotally carried in an extending leg portion of said channel-shaped container retainer.

26. Apparatus for lifting and tilting a container as in claim 25 in which the channel container retainer includes two pivoted arms, and there is additionally provided in at least one pivoted arm a second additional hydraulic cylinder adapted to move a connected toothed rack which is in meshed contact and relationship with a pinion secured to a shaft which has on its other end an arcuate clamp whereby said second additional hydraulic cylinder is moved, the arcuate clamp rotated to provide the desired tilt of the container.

* * * * *